(12) United States Patent
Kindred

(10) Patent No.: US 7,263,911 B2
(45) Date of Patent: Sep. 4, 2007

(54) STEERING WHEEL ASSEMBLY

(75) Inventor: Thomas Charles Kindred, Wickford (GB)

(73) Assignee: CNH America LLC, New Holland, PA (US)

( * ) Notice: Subject to any disclaimer, the term of this patent is extended or adjusted under 35 U.S.C. 154(b) by 357 days.

(21) Appl. No.: 10/993,528

(22) Filed: Nov. 19, 2004

(65) Prior Publication Data

US 2005/0109153 A1     May 26, 2005

(30) Foreign Application Priority Data

Nov. 22, 2003 (GB) ................................ 0327229.1

(51) Int. Cl.
    *B62D 1/06*      (2006.01)
(52) U.S. Cl. ............................ 74/557; 74/552; 74/553; 74/558
(58) Field of Classification Search ................ 74/552, 74/557, 558, 553
See application file for complete search history.

(56) References Cited

U.S. PATENT DOCUMENTS

| 1,555,599 | A | * | 9/1925 | Ontiveros ..................... 74/557 |
| 1,748,230 | A | * | 2/1930 | Keating ......................... 70/90 |
| 2,131,649 | A | * | 9/1938 | Turnage ................... 74/484 R |
| 2,228,393 | A | * | 1/1941 | Leaming ..................... 137/352 |
| 2,305,527 | A | * | 12/1942 | Hassett ......................... 74/557 |
| 2,468,314 | A | * | 4/1949 | Vogel ............................ 74/494 |
| 3,554,052 | A | * | 1/1971 | Mross ........................... 74/557 |
| 5,676,349 | A | * | 10/1997 | Wilson ....................... 254/266 |
| 5,755,142 | A | * | 5/1998 | Jacoby ......................... 74/552 |
| 6,062,102 | A | | 5/2000 | Jacoby |
| 6,161,449 | A | * | 12/2000 | Fujimori ...................... 74/557 |
| 6,343,526 | B2 | * | 2/2002 | Reicks et al. ................. 74/557 |
| 2001/0027699 | A1 | * | 10/2001 | Reicks et al. ................. 74/557 |

FOREIGN PATENT DOCUMENTS

| GB | 0327229.1 | 12/2003 |
| JP | 4356272 | 12/1992 |
| WO | WO 1996/025300 A1 | 8/1996 |
| WO | WO99/14095 | 3/1999 |

* cited by examiner

*Primary Examiner*—Richard Ridley
*Assistant Examiner*—Matthew A. Johnson
(74) *Attorney, Agent, or Firm*—Michael G. Harms; John William Stader

(57) ABSTRACT

A steering wheel assembly for a machine or a vehicle includes a steering wheel and a pommel mounted on the steering wheel for rotation about an axis extending parallel to the axis of rotation of the steering wheel to facilitate one-handed rotation of the steering wheel. The pommel carries control switches to control functions of the machine or vehicle in particular to allow shuttling between forward and reverse drive. A mechanism is connected to the pommel to rotate the pommel relative to the steering wheel in synchronism with the rotation of the steering wheel about its axis in such a manner as to maintain the same orientation of the pommel in all positions of the steering wheel.

1 Claim, 1 Drawing Sheet

STEERING WHEEL ASSEMBLY

CROSS REFERENCE TO RELATED PATENT APPLICATIONS

Priority, and incorporation by reference, is hereby claimed under 35 U.S.C. 119 to Great Britain Patent Application GB 0327229.1, titled "Steering Wheel Assembly", filed Nov. 22, 2003, and having Thomas Charles Kindred as an inventor.

BACKGROUND OF THE INVENTION

The present invention relates to a steering wheel assembly for a machine or vehicle. The steering wheel assembly of the invention is intended primarily for use on loading vehicles such as telehandlers, loading shovels and forklift trucks but it may find application in agricultural tractors, in particular those fitted with a front end loader.

In loading vehicles, it is quite common for the steering wheel to be fitted with a swivelling knob or lever, hereinafter termed a pommel, which allows the steering of the vehicle to be done quickly and efficiently with one hand. This is typically done with the left hand, to leave the right hand free to operate a joystick which controls the loader. This is particularly useful for loader work, which involves extensive steering and operating of the loader at the same time. With this kind of work, it is also frequently required to change the direction of movement and typically this is done with a shuttle lever mounted as a stalk off the steering column. This however means the left hand needs to be taken off the knob and moved to operate the shuttle lever.

It has already been proposed to incorporate a switch in the pommel, an example of this being shown in JP 4-356272. WO99/14095 also shows a control lever that is rotatably mounted on a steering wheel and carries switches to control the gear selection.

Both the above proposals, rely on the fact that if the pommel is gripped at all times, then it maintains a fixed orientation in relation to the driver. There are however times when the steering wheel will be turned without using the pommel, whereupon on returning his hand to the pommel the driver will not find the controls correctly oriented.

SUMMARY OF THE INVENTION

With a view to mitigating the foregoing disadvantage, the present invention provides a steering wheel assembly for a machine or a vehicle having a steering wheel and a pommel mounted on the steering wheel for rotation about an axis extending parallel to the axis of rotation of the steering wheel to facilitate one-handed rotation of the steering wheel, at least one control switch being mounted on the pommel, characterised in that a mechanism is connected to the pommel to rotate the pommel relative to the steering wheel in synchronism with the rotation of the steering wheel about its axis in such a manner as to maintain the same orientation of the pommel in all positions of the steering wheel.

While one can envisage electrical or hydraulic mechanisms for rotating the pommel as the steering wheel is rotated to maintain the same orientation of the pommel in all positions of the steering wheel, it is preferred for simplicity and low cost for the mechanism to comprise a mechanical linkage.

The mechanical linkage may conveniently comprise a pin mounted on a cranking arm rotatable with the pommel, a ring mounted for rotation about an axis offset from the axis of rotation of the steering wheel by a distance equal to the distance between the axes of the cranking pin and the pommel and a connecting bar pivotably connected at its opposite ends to the crank pin and the ring, respectively.

Advantageously, a lever arm is pivotably connected at its opposite ends to the steering wheel and to the eccentric ring, respectively, to cause the ring to rotate as the steering wheel is rotated.

DESCRIPTION OF THE DRAWINGS

The invention will now be described further, by way of example, with reference to the accompanying drawings, in which.

DETAILED DESCRIPTION OF THE PREFERRED EMBODIMENTS

Figure 1:
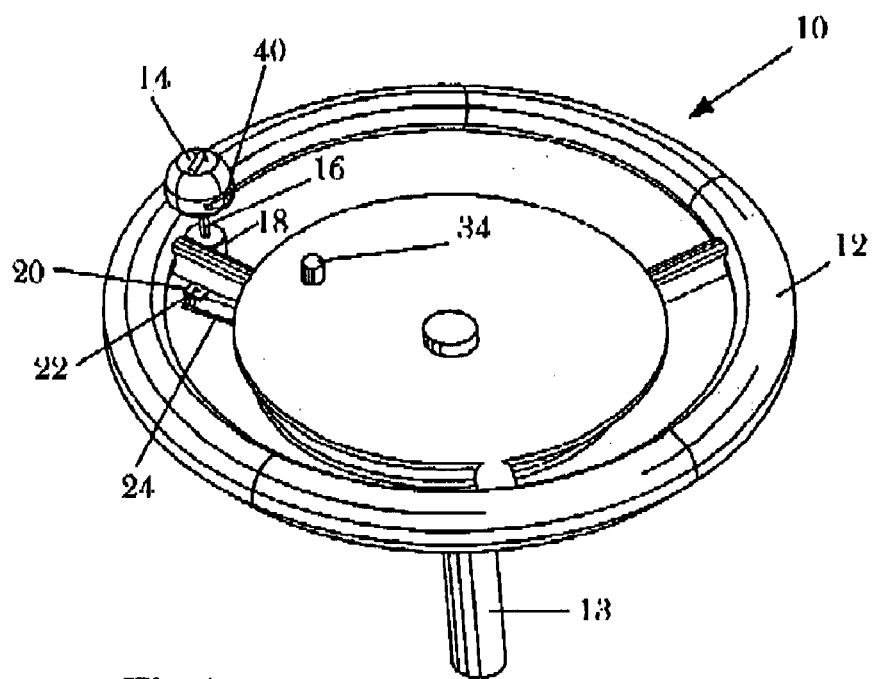
FIG. 1 shows a perspective view of a steering assembly of the invention.

FIG. 1 shows a steering wheel assembly 10 comprising a steering wheel 12 coupled to a steering shaft 13. A pommel 14 is provided on the outer edge of the steering wheel 12 to allow one-handed rotation of the steering wheel 12. The pommel 14 is mounted on a shaft 16 which is journalled in a bearing 18 in the steering wheel 12. Gear selection switches 40 are mounted on the pommel to enable the machine to shuttle between forward and reverse drive. The control switches 40 in the pommel 14 may be linked with slip ring connector through the shaft 16 of the pommel 14 and the steering wheel shaft 13. Alternatively, the switches may activate a remote wireless connection, such as by the use of infra-red.

Figure 2:
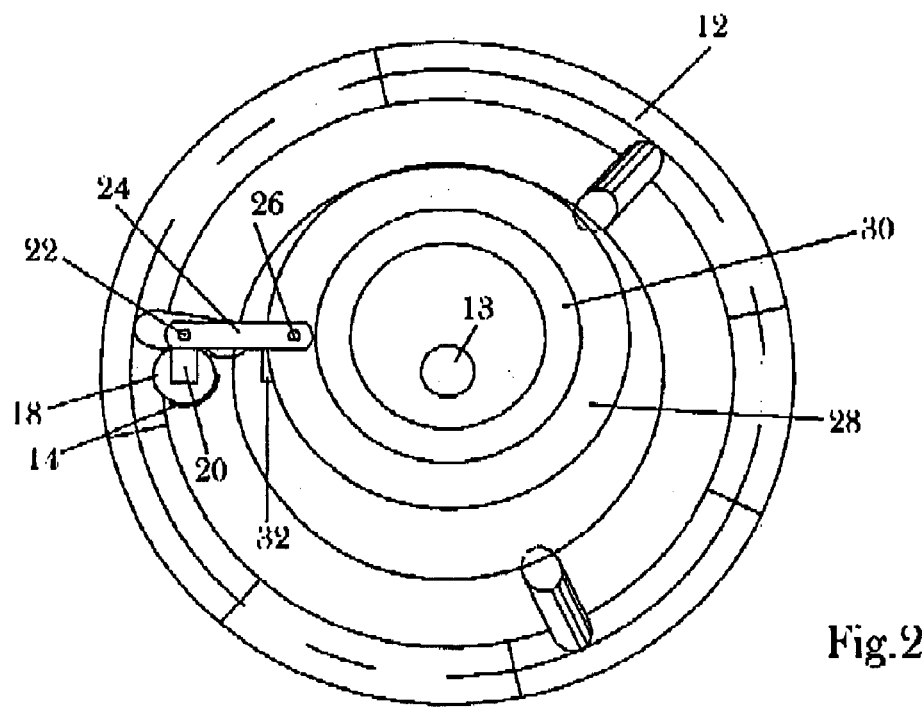
FIG. 2 is a plan view from below of the steering wheel assembly of FIG. 1 showing the linkage for maintaining a fixed orientation of the pommel in all positions of the steering wheel.

The lower end of the shaft 16 carries a cranking arm 20 which rotates with the pommel and carries an eccentric cranking pin 22. As illustrated in FIG. 2, a connecting bar 24 is pivotably mounted at one end about the cranking pin 22 and is pivotably connected at its other end to a pin 26 projecting from a ring 28. The latter ring 28 is free to rotate about an stationary disc 30 which does not rotate with the steering wheel 12. The stationary disc 30 constrains the ring 28 to rotate about an axis that is eccentric with respect to the axis of the steering wheel 12, the eccentricity being equal to the eccentricity of the cranking pin 22.

A further lever arm 32 is pivotably mounted at one end on the ring 28 and its other end is connected to a pivot pin 34 (FIG. 1) on the steering wheel. As the steering wheel 12 is rotated about its own axis, the lever arm 32 acts to rotate the ring 28 about the eccentric axis defined by the stationary disc 30.

During rotation of the steering wheel assembly, the connecting bar 24 linking the pin 26 of the ring 28 to the cranking pin 22 of the pommel causes the pommel to rotate in the opposite direction to the steering wheel but at the same rate, thereby always maintaining the same orientation of the pommel. This enables the control switches 40 mounted on the pommel 14 to remain in the same orientation with respect to the driver in all positions of the steering wheel 12. Furthermore, any decal or motif placed on the knob will always remain upright regardless of the position of the steering wheel assembly.

The preferred embodiment of the invention thus allows the direction of travel of the machine to be selected without the driver removing his hand from the steering wheel. This will not only be more convenient to the operator but will allow for faster cycle times as the steering operation is not interrupted to operate a shuttle lever.

For a vehicle with hydrostatic or torque converter type transmission, the preferred embodiment of the invention also allows for easy disengagement of drive when for example it is desired to increase the engine revs to increase hydraulic flow for loader operation without causing the vehicle to move.

What is claimed is:

1. A steering wheel assembly for a machine or a vehicle having a steering wheel coupled to a steering shaft, the steering wheel shaft defining an axis of rotation of the steering wheel, and a pommel mounted on the steering wheel for rotation about a pommel axis extending parallel to the axis of rotation of the steering wheel to facilitate one-handed rotation of the steering wheel, the steering wheel assembly comprising:

a stationary disc eccentrically mounted to the steering shaft defining an eccentric axis that is eccentric with respect to the axis of rotation of the steering wheel, wherein the stationary disc does not rotate with the steering wheel; and at least one control switch being mounted on the pommel, wherein a mechanical linkage is connected to the pommel to rotate the pommel relative to the steering wheel in synchronism with the rotation of the steering wheel about the axis of rotation of the steering wheel in such a manner as to maintain the same orientation of the pommel in all positions of the steering wheel, wherein in the mechanical linkage comprises;

a cranking pin mounted on a cranking arm rotatable with the pommel, the cranking pin eccentrically mounted about the pommel axis;

a ring rotatably mounted to the stationary disc for rotation about the eccentric axis, the stationary disc constrains the ring to rotate about the eccentric axis, the eccentricity of the ring and the axis of rotation of the steering wheel being substantially equal to the eccentricity of the cranking pin and the pommel axis;

a connecting bar pivotably connected at its opposite ends to the cranking pin and the ring, respectively; and a lever arm is pivotably connected at its opposite ends to the steering wheel and to the ring, respectively, to cause the ring to rotate as the steering wheel is rotated.

* * * * *